UNITED STATES PATENT OFFICE.

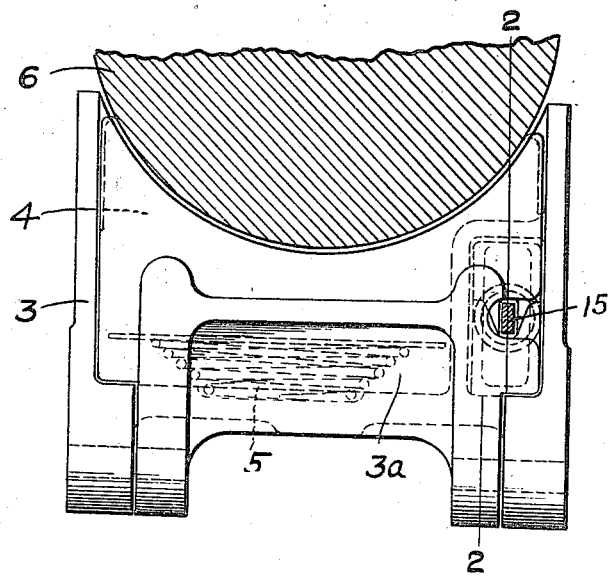
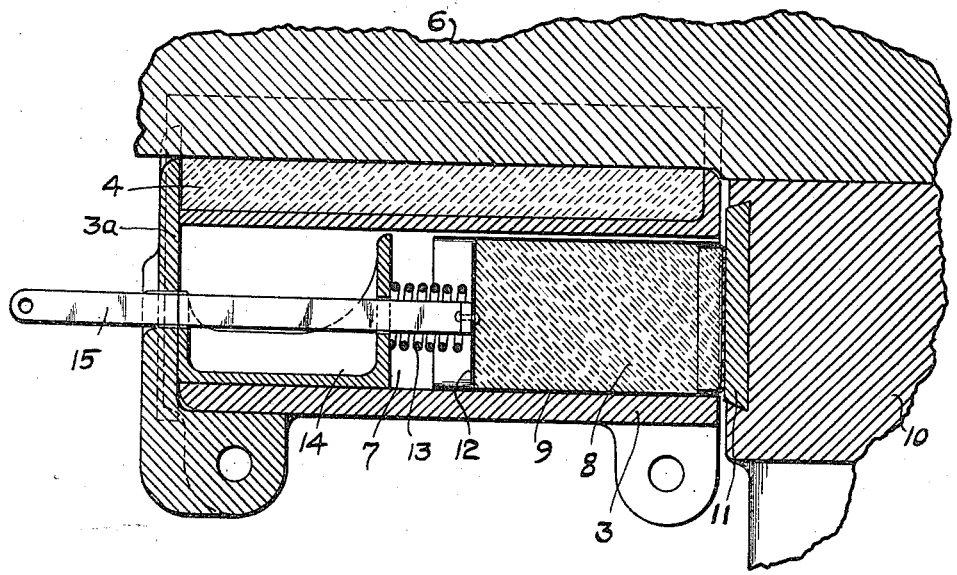

FREDERICK W. MARTIN, OF NEW YORK, N. Y., ASSIGNOR TO FRANKLIN RAILWAY SUPPLY COMPANY, OF WILMINGTON, DELAWARE, A CORPORATION OF DELAWARE.

DRIVING-BOX HUB-LUBRICATOR.

1,268,748. Specification of Letters Patent. Patented June 4, 1918.

Application filed November 15, 1917. Serial No. 202,182.

*To all whom it may concern:*

Be it known that I, FREDERICK W. MARTIN, of the borough of Queens, in the county of Queens, city and State of New York, have invented a certain new and useful Improvement in Driving-Box Hub-Lubricators, of which improvement the following is a specification.

This invention relates to lubricators for driving boxes of locomotives or other vehicles, and has for its object to provide improved means for lubricating the hub of the wheel.

Heretofore grease lubricators have been used for the journals of the driving axles of locomotives, but, owing to the lateral thrust of the drivers, particularly when passing through switches and around curves, considerable frictional resistance is produced between inner face of the journal box and the hub of the wheel. The practice has been for the engineer to lubricate this wearing surface with oil from his can, but this is often forgotten or neglected, and as a result the hubs heat and cut out rapidly.

My invention consists in providing a grease cake, or a container with solid lubricant bearing against the hub of the wheels and means for pressing the same laterally against the hub.

According to a preferred construction the hub lubrication is located in one side of the cellar ordinarily used for the journal lubricant and is so shown in the accompanying drawing, in which Figure 1 is a front elevation of the lubricant cellar with the axle shown in cross section; and Fig. 2, a longitudinal section taken on the line 2—2 of Fig. 1, and showing a portion of the axle and the hub of the wheel.

My improvement may be applied in connection with the usual standard form of journal box having a lubricant cellar, 3, with a cover, 3ª, and containing a grease cake, 4, or container with solid lubricant, and a spring, 5, for pressing the same against the axle journal, 6, in the well known manner. According to a preferred construction of my improvement, one side of the cellar, 3, is partitioned off to form a chamber, 7, having an opening through the end wall of the cellar and containing a grease cake, 8, in a container, 9, which has a perforated end extending through the said opening and bearing against the hub, 10, of the wheel. A wear plate, 11, may be inserted in the hub at this point.

A follower, 12, is mounted in the container, 9, and has a spring, 13, bearing against the same for the purpose of maintaining a constant pressure of the grease against the hub of the wheel, the other end of the spring engaging a wall of the cellar or a filling block, 14, in the chamber, 7. An indicating rod, 15, may be attached to the follower, 12, and extend outside of the casing at the front of the cellar to show the amount of grease in the container at any time in order that the same may be refilled when exhausted.

My improvement has the advantage of providing a continuous lubrication for the hub of the wheel, preventing heating and cutting out of the same; does not increase the size of the journal box nor require additional space as it is contained within the original lubricant cellar; it is also automatic and requires no further attention than the axle lubrication, that is, to replenish the cake of grease when exhausted.

What I claim as new, and desire to secure by Letters Patent, is:

1. In a lubricator, the combination of a solid lubricant and means for pressing the same laterally against the hub of the wheel.

2. In a lubricator, the combination of a solid lubricant, a perforated container therefor, and a spring for pressing the same against the hub of the wheel.

3. In a lubricator, the combination of a lubricant cellar having a chamber with an opening, a solid lubricant and means for pressing said lubricant through said opening and against the face of the hub of the wheel.

4. In a lubricator, the combination of a lubricant cellar having a chamber with an opening, a container having a perforated end extending through said opening, a solid lubricant in said container, and means for pressing said lubricant against the hub of the wheel.

5. In a lubricator, the combination of a lubricant cellar having a chamber at one side and provided with an opening opposite the face of the hub of the wheel, a container in said chamber and having a perforated end extending through said opening, a lubricant in the container, and a follower and spring for pressing the lubricant against the hub of the wheel.

6. In a lubricator, the combination of a lubricant cellar having a chamber provided with an opening, a container having a perforated end extending through said opening, a lubricant in the container, a follower therein, and an indicator rod extending from said follower outside of the cellar casing.

In testimony whereof I have hereunto set my hand.

FREDERICK W. MARTIN.

Copies of this patent may be obtained for five cents each, by addressing the "Commissioner of Patents, Washington, D. C."